(12) United States Patent
Koreeda et al.

(10) Patent No.: US 7,990,831 B2
(45) Date of Patent: Aug. 2, 2011

(54) OPTICAL PICKUP DEVICE

(75) Inventors: Daisuke Koreeda, Saitama (JP); Shuichi Takeuchi, Saitama (JP)

(73) Assignee: Hoya Corporation, Tokyo (JP)

( * ) Notice: Subject to any disclaimer, the term of this patent is extended or adjusted under 35 U.S.C. 154(b) by 574 days.

(21) Appl. No.: 12/146,883

(22) Filed: Jun. 26, 2008

(65) Prior Publication Data
US 2009/0016194 A1 Jan. 15, 2009

(30) Foreign Application Priority Data
Jul. 13, 2007 (JP) .................. 2007-184859

(51) Int. Cl.
*G11B 7/00* (2006.01)

(52) U.S. Cl. ......... 369/112.02; 369/112.23; 369/112.01; 369/44.37

(58) Field of Classification Search .............. None
See application file for complete search history.

(56) References Cited

U.S. PATENT DOCUMENTS

| 7,206,276 B2 | 4/2007 | Kimura et al. |
| 7,319,655 B2 * | 1/2008 | Kimura ................. 369/112.01 |
| 2005/0002118 A1 | 1/2005 | Maruyama et al. |
| 2005/0078593 A1 | 4/2005 | Maruyama et al. |
| 2005/0157624 A1 | 7/2005 | Koreeda et al. |
| 2005/0281173 A1 | 12/2005 | Koreeda et al. |
| 2006/0083122 A1 | 4/2006 | Wakabayashi et al. |
| 2006/0181978 A1 | 8/2006 | Koreeda et al. |
| 2008/0074976 A1 | 3/2008 | Nishikawa et al. |

FOREIGN PATENT DOCUMENTS

| JP | 9-306024 | 11/1997 |
| JP | 2004-79146 | 3/2004 |
| JP | 2006-147126 | 6/2006 |

OTHER PUBLICATIONS

English language Abstract of JP 9-306024, Nov. 28, 1997.
Nakahara, "Blu-ray Disc yo Koteibu Haichigata Ekisho Shusa Hosei Soshi," O plus E, vol. 27, No. 4, pp. 413-417, 2005.
Iwasaki et al., "New Electrode Structure of Liquid Crystal Panel for Sphere aberration correction", Pioneer R&D, vol. 13, No. 1, pp. 34-40, Mar. 31, 2003.

* cited by examiner

*Primary Examiner* — Muhammad N Edun
(74) *Attorney, Agent, or Firm* — Greenblum & Bernstein P.L.C.

(57) ABSTRACT

An optical pickup device includes a first light source emitting first light with a first wavelength, a second light source emitting second light with a second wavelength, a third light source emitting third light with a third wavelength, an objective lens having a step structure, the objective lens being disposed to satisfy predetermined conditions, at least one first coupling lens making the first light and the second light incident onto the objective lens as converged light, a second coupling lens making the third light incident onto the objective lens as diverging light, and a liquid crystal aberration correcting element.

13 Claims, 6 Drawing Sheets

-0.005   0.005
(HD-DVD)

-0.005   0.005
(DVD)

THICK LINE:
FIRST EMBODIMENT
(BEFORE CORRECTION)

THIN LINE:
FIRST COMPARATIVE
EXAMPLE

FIG. 6

THICK LINE:
FIRST EMBODIMENT
(BEFORE CORRECTION)

THIN LINE:
FIRST EMBODIMENT
(AFTER CORRECTION)

THICK LINE: SECOND EMBODIMENT
THIN LINE: FIRST COMPARATIVE EXAMPLE

OPTICAL PICKUP DEVICE

BACKGROUND OF THE INVENTION

The following description relates to one or more improved optical pickup devices configured to perform read/write operations with a common objective lens for optical disks complying with three different standards such as a CD, DVD, and HD DVD having a higher recording density than that of the DVD.

An optical pickup device configured to perform read/write operations with a common objective lens for two or more optical disks complying with respective different standards is disclosed, for example, in Japanese Patent Provisional Publications No. HEI 9-306024 (see FIG. 1, hereinafter referred to as '024 Publication), No. 2004-79146 (see paragraphs 0312 and 0313, hereinafter referred to as '146 Publication), and No. 2006-147126 (see FIG. 1 and paragraphs 0031 to 0034, and 0047, hereinafter referred to as '126 Publication). The '024 Publication discloses an optical system that employs a common objective lens for a CD and DVD and changes magnification of the objective lens depending on sorts of optical disks in order to restrain aberration due to temperature change. Particularly, the optical system is configured to cause converged light to be incident onto the objective lens in use of the DVD and to cause collimated light to be incident onto the objective lens in use of the CD.

The '146 Publication discloses a technique to correct spherical aberration due to wavelength change or temperature change with a refractive index distribution changing device in a device that performs read/write operations with a common objective lens for optical disks such as the CD, DVD, and an optical disk having a higher recording density than that of the DVD with blue laser light. The refractive index distribution changing device is configured with a liquid crystal layer provided between a pair of transparent electrodes facing each other, at least one of which is divided into a plurality of concentric sections. When a voltage is applied to a part of the concentric sections, an orientation condition of liquid crystal molecules in the liquid crystal layer is electrically controlled to change a refractive index distribution in the liquid crystal layer.

Additionally, the '126 Publication discloses, as a first embodiment, an optical pickup capable of read/write operations with a common optical system for the CD, DVD, and HD DVD. The optical system is configured to correct aberration due to wavelength difference in use of the DVD and HD DVD with an objective lens having a step-shaped annular zone structure formed thereon, and to correct spherical aberration that cannot completely be corrected by the objective lens with a phase compensator in use of the CD. There is employed as the phase compensator, a liquid crystal aberration correcting device configured in the same manner as disclosed in the '146 Publication.

However, the optical pickup described in the '024 Publication can meet only two types of optical disks, the DVD and CD, yet is not adopted to meet three types of optical disks which also include the HD DVD having a higher recording density than that of the DVD.

Additionally, the '146 Publication discloses that the liquid crystal device is employed in order to correct the spherical aberration due to the temperature change in use of the HD DVD. However, as far as the '146 Publication discloses, since the DVD especially has a great absolute value of magnification, it might result in an increased aberration due to a tracking operation and thus an undesired trouble in the read/write operations.

Further, the optical pickup disclosed in the '126 Publication renders collimated light incident onto the objective lens in use of any of the CD, DVD, and HD DVD, and therefore the aberration is not increased by the tracking operation. However, since an aberration amount to be corrected by the phase compensator in use of the CD is significant, it is required to thicken the liquid crystal device employed as the phase compensator and to ensure a high relative positional accuracy between the objective lens and phase compensator. The phase compensator is driven along with the objective lens by a tracking mechanism, and therefore a thick liquid crystal results in a heavier load on the tracking mechanism, and thus a more difficult assembling process is required to ensure the high relative positional accuracy between the objective lens and phase compensator. Additionally, the '126 Publication does not disclose a technique to restrain aberration due to environmental change such as temperature change in use of the DVD and HD DVD.

SUMMARY OF THE INVENTION

The present invention is advantageous in that there are provided one or more improved optical pickup devices capable of read/write operations for a CD, DVD, and HD DVD with a common objective lens and a common liquid crystal aberration compensator, which devices can restrain aberration due to a tracking operation, provide a small load on a tracking mechanism and an easy assembling process therefor, and reduce aberration due to environmental change.

According to aspects of the present invention, there is provided an optical pickup device configured to perform read/write operations for a first optical disk, a second optical disk, and a third optical disk. The optical pickup device includes a first light source configured to emit first light with a first wavelength in use of the first optical disk, a second light source configured to emit second light with a second wavelength longer than the first wavelength in use of the second optical disk, a third light source configured to emit third light with a third wavelength longer than the second wavelength in use of the third optical disk, an objective lens having a step structure on at least one surface thereof, the step structure being formed with a plurality of refractive surfaces as concentrically-divided annular zones so as to provide incident light with a predetermined optical path length difference at a step between any adjacent two of the refractive surfaces, the objective lens being configured to converge the first light, the second light, and the third light onto the first optical disk, the second optical disk, and the third optical disk, respectively, at least one first coupling lens configured to make the first light and the second light incident onto the objective lens as converged light, a second coupling lens configured to make the third light incident onto the objective lens as diverging light, and a liquid crystal aberration correcting element provided on a common optical path between one of the at least one first coupling lens and the second coupling lens and the objective lens, the liquid crystal aberration correcting element being configured with a plurality of concentrically-divided areas so as to provide incident light with a predetermined optical path length difference in each of the areas and correct aberration. Further, a following condition is satisfied:

$$NA1 > NA3, \text{ and } NA2 > NA3,$$

where NA1 represents a numerical aperture required for use of the first optical disk, NA2 represents a numerical aperture required for use of the second optical disk, and NA3 represents a numerical aperture required for use of the third optical disk. Further, the step structure includes a first area required for ensuring NA3, the first area being formed to provide incident light, at each step therein, with an optical path length difference substantially twice as long as the first wavelength. Further, the objective lens is disposed so as to satisfy following conditions (1), (2), and (3):

$$0.05 < f1 \times M1 < 0.20 \qquad (1)$$

$$0.05 < f2 \times M2 < 0.20 \qquad (2)$$

$$-0.23 < f3 \times M3 < -0.03 \qquad (3)$$

where f1 and M1 represent a focal length and an imaging magnification of the objective lens in use of the first optical disk, respectively, f2 and M2 represent a focal length and an imaging magnification of the objective lens in use of the second optical disk, respectively, and f3 and M3 represent a focal length and an imaging magnification of the objective lens in use of the third optical disk, respectively.

Optionally, the first optical disk may have a protective layer with a first thickness t1 and a first recording density. In this case, the second optical disk may have a protective layer with a second thickness t2 equal to or thicker than the first thickness t1 and a second recording density smaller than the first recording density, and the third optical disk may have a protective layer with a third thickness t3 thicker than the second thickness t2 and a third recording density smaller than the second recording density.

Optionally, spherical aberration caused by a wavelength difference between the first light, second light, and third light and a protective layer thickness difference between the first, second, and third optical disks may be corrected owing to the step structure and the disposal of the objective lens to satisfy the conditions (1), (2), and (3). Further optionally, spherical aberration caused by an environmental change may be corrected by controlling the liquid crystal aberration correcting element.

Optionally, the first thickness of the protective layer of the first optical disk and the second thickness of the protective layer of the second optical disk may be equal to about 0.6 mm. Further, the third thickness of the protective layer of the third optical disk may be equal to about 1.2 mm.

Optionally, the objective lens may be disposed to further satisfy a following condition (4):

$$-0.02 < f2 \times M2 - f1 \times M1 < 0.02 \qquad (4).$$

Optionally, the liquid crystal aberration correcting element may be configured to provide incident light with an optical path length difference 0.2 times as long as the first wavelength or less.

Optionally, the objective lens may be provided to follow a tracking operation for making a spot formed on each of the optical disks follow a track on each of the optical disks. Further optionally, the liquid crystal aberration correcting element may be provided not to follow the tracking operation.

Optionally, the step structure of the objective lens may include a second area outside the first area. In this case, the second area may be formed to converge only the first light and the second light on recording surfaces of the first and second optical disks, respectively. Further, the second area may be formed by combining a step structure configured to provide incident light at each step thereof with a positive or negative optical path length difference substantially twice as long as the first wavelength and a structure configured to provide incident light at each step thereof with a positive or negative optical path length difference substantially five times as long as the first wavelength.

Still optionally, an effective diameter of the first light on a lens surface of the objective lens at a light source side may be larger than an effective diameter of the second light on a lens surface of the objective lens at a light source side. In this case, the step structure of the objective lens may include a third area outside the second area. Further, the third area may be formed to converge only the first light on the recording surface of the first optical disk. Further, the optical path length difference provided to the first light at each step in the third area may be different from an optical path length difference provided to the first light at each step in the second area.

Yet optionally, the third area may be formed to provide incident light with a optical path length difference substantially as long as the first wavelength.

Alternatively, an effective diameter of the second light on a lens surface of the objective lens at a light source side may be larger than an effective diameter of the first light on a lens surface of the objective lens at a light source side. In this case, the step structure of the objective lens may include a third area formed outside the second area to converge only the second light on the recording surface of the second optical disk. Further, the optical path length difference provided to the second light at each step in the third area may be different from an optical path length difference provided to the second light at each step in the second area.

Still optionally, the third area may be formed to provide incident light with a optical path length difference substantially as long as the second wavelength.

Optionally, the optical pickup device may be configured to satisfy a following condition (5):

$$\lambda 1/(n1-1):\lambda 3/(n3-1) \approx 1:2 \qquad (5)$$

where λ1 represents the first wavelength, λ3 represents the third wavelength, n1 represents a refractive index of the objective lens for the first wavelength λ1, and n3 represents a refractive index of the objective lens for the third wavelength λ3.

DETAILED DESCRIPTION OF THE EMBODIMENTS

Hereinafter, optical pickup devices in embodiments according to aspects of the present invention will be described. The optical pickup devices of the embodiments are configured to perform read/write operations for a first optical disk (HD DVD) having the highest recording density and a protective layer thickness t1 of about 0.6 mm, a second optical disk (DVD) having the second highest recording density and a protective layer thickness t2 of about 0.6 mm, and a third optical disk (CD) having the lowest recording density and a protective layer thickness t3 of about 1.2 mm. In the following description, explanation of three embodiments will be given.

First Embodiment

Figure 1:
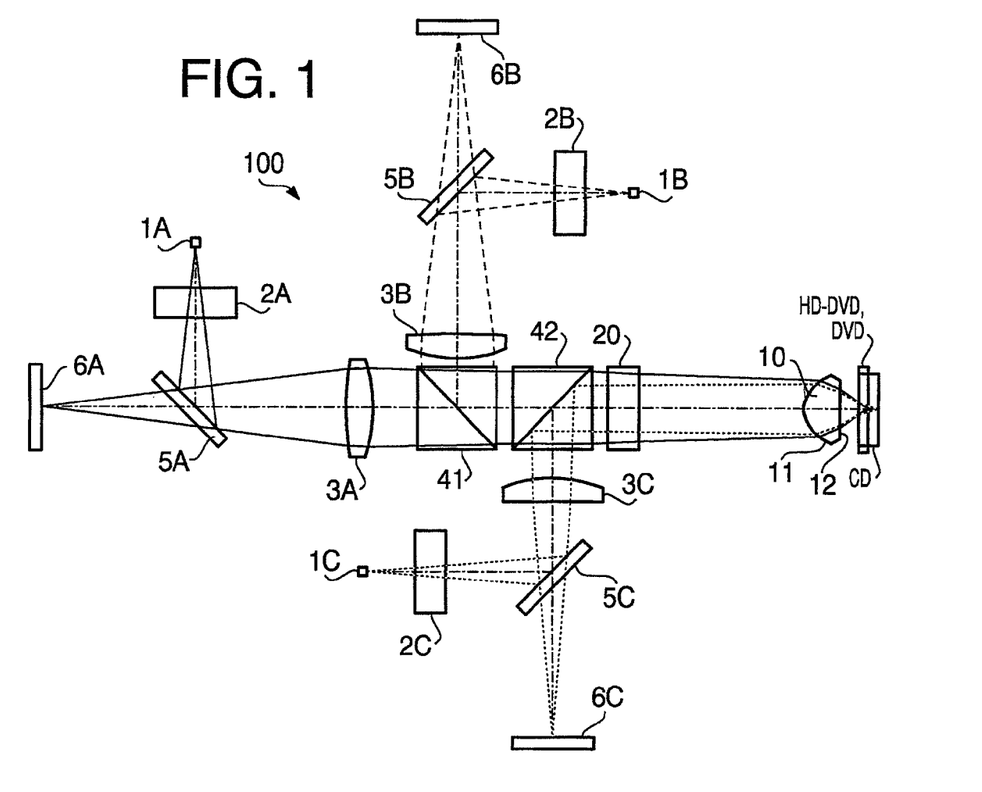
FIG. 1 schematically shows an optical system of an optical pickup device in a first embodiment according to one or more aspects of the present invention.
Figures 2A, 2B, 2C:
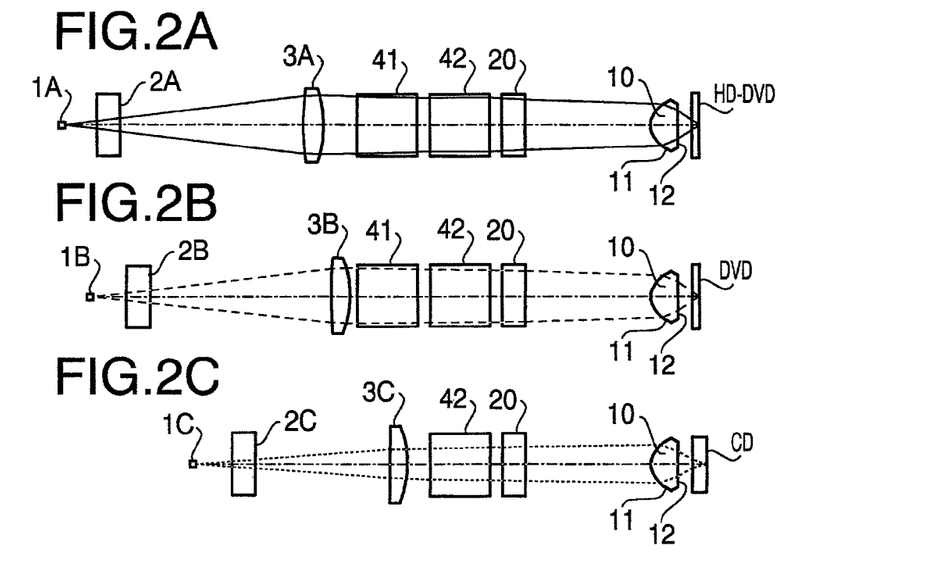
FIGS. 2A to 2C show schematic configurations obtained when three optical systems included in the optical system shown in FIG. 1 are individually developed in the first embodiment according to one or more aspects of the present invention.

FIG. 1 schematically shows an optical system of an optical pickup device 100 in a first embodiment according to aspects of the present invention. FIGS. 2A to 2C show schematic configurations obtained when three optical systems included in the optical system shown in FIG. 1 are individually developed. FIG. 2A shows an optical system for an HD DVD. FIG. 2B shows an optical system for a DVD. FIG. 2C shows an optical system for a CD. As shown in these figures, the optical pickup device 100 of the first embodiment is provided with three laser light sources, which include a first light source 1A that emits light with a first wavelength (405 nm) in use of the HD DVD, a second optical source 1B that emits light with a second wavelength (660 nm) in use of the DVD, and a third light source 1C that emits light with a third wavelength (790 nm) in use of the CD.

In use of the HD DVD, laser light emitted as diverging light by the first light source 1A is transmitted through a diffraction grating 2A to form a sub beam used for tracking servo, reflected by a half mirror 5A, converged through a first coupling lens 3A, transmitted through a liquid crystal aberration correcting device 20 via first and second beam splitters 41 and 42, and transmitted through an objective lens 10 to form a spot on a recording surface of the HD DVD. Then, the light reflected by the HD DVD, tracing the same path as directed toward the HD DVD, is transmitted through the half mirror 5A to be incident to a detector 6A. The detector 6A is a widely-known device having a plurality of light receiving areas, and generates a playback signal, tracking error signal, and focusing error signal.

In use of the DVD, laser light emitted by the second light source 1B is transmitted through a diffraction grating 2B, reflected by a half mirror 5B, converged through a second coupling lens 3B, reflected by the first beam splitter 41, transmitted through the liquid crystal aberration correcting device 20 via the second beam splitter 42, and transmitted through the objective lens 10 to form a spot on a recording surface of the DVD. Then, the light reflected by the DVD, tracing the same path as directed toward the DVD, is transmitted through the half mirror 5B to be incident to a detector 6B.

In use of the CD, laser light emitted by the third light source 1C is transmitted through a diffraction grating 2C, reflected by a half mirror 5C, converted into slightly-diverging light through a third coupling lens 3C, reflected by the second beam splitter 42, transmitted through the liquid crystal aberration correcting device 20, and transmitted through the objective lens 10 to form a spot on a recording surface of the CD. Then, the light reflected by the CD, tracing the same path as the route toward the CD, is transmitted through the half mirror 5C to be incident to a detector 6C.

The objective lens 10 is a single biconvex lens with an aspheric lens surface 11 at a light source side and an aspheric lens surface 12 at an optical disk side, and commonly used for the three types of optical disks. The lens surface 11 of the objective lens 10 at the light source side is formed with a diffraction lens structure having a plurality of refractive surfaces as concentrically-divided annular zones. The diffraction lens structure provides incident light with a corresponding optical path length difference at a boarder step between any two adjacent refractive surfaces. It is noted that the diffraction lens structure is defined as a structure that provides a diffraction effect with one or more steps as long as a wavelength of incident light.

The optical pickup device 100 is provided with a tracking mechanism (not shown) that causes a spot formed on an optical disk to follow a track on the optical disk. The objective lens 10 is mounted on the tracking mechanism, and the liquid crystal aberration correcting device 20 is disposed outside the tracking mechanism.

The aforementioned optical system is configured to satisfy the following condition:

NA1>NA3 and NA2>NA3, where NA1 represents a numerical aperture required for use of the HD DVD, NA2 represents a numerical aperture required for use of the DVD, and NA3 represents a numerical aperture required for use of the CD. Specifically, NA1=0.65, NA2=0.63, and NA3=0.47.

The diffraction lens structure is sectioned into a first area necessary for ensuring the above NA3 and a second area outside the first area. The diffraction lens structure is formed to provide an optical path length difference substantially twice as long as the wavelength 405 nm at each step of the first area. Thereby, diffraction orders used are a second order for the wavelength 405 nm and a first order for the wavelengths 660 nm and 790 nm. Namely, for any of the optical disks, it is possible to utilize light emitted by a corresponding light source with high efficiency. In the case where the diffraction lens structure is designed with respect to the first order to sixth order to obtain a diffraction efficiency of 100% for the wavelength 405 nm, diffraction efficiencies of the other two wavelength are represented as Table 1 shown below.

TABLE 1

(in the case where material of the objective lens: nd = 1.509, νd = 56.4, and a blaze wavelength is 405 nm)

| λ = 405 nm | | λ = 660 nm | | λ = 790 nm | |
| --- | --- | --- | --- | --- | --- |
| Diffraction Order | Diffraction Efficiency | Diffraction Order | Diffraction Efficiency | Diffraction Order | Diffraction Efficiency |
| First | 100% | First | 56% | Zero/First | 42%/39% |
| Second | 100% | First | 89% | First | 100% |
| Third | 100% | Second | 85% | First/Second | 44%/37% |
| Fifth | 100% | Third | 100% | Second/Third | 47%/34% |
| Sixth | 100% | Third/Fourth | 32%/49% | Third | 99% |

It is understood from the above result that the maximum diffraction efficiency is obtained when diffracted light of the second order is used for the light with the wavelength 405 nm, and diffracted light of the first order is used for each of the other wavelengths. Therefore, the diffraction lens structure in the first area is designed to use the second order of diffracted light for the light with the wavelength 405 nm.

However, in this respect, when a magnification of the objective lens is substantially the same between the HD DVD and the DVD, the second diffraction order for the wavelength 405 nm causes a larger aberration due to temperature change. This is because a power provided by the diffraction surface has an effect to increase the aberration due to the temperature change. Hence, the optical pickup device of the first embodiment is configured to set the second diffraction order for the light with the wavelength 405 nm with the emphasis on the diffraction efficiency and to correct spherical aberration due to the temperature change with the liquid crystal aberration correcting device 20.

Figure 3:
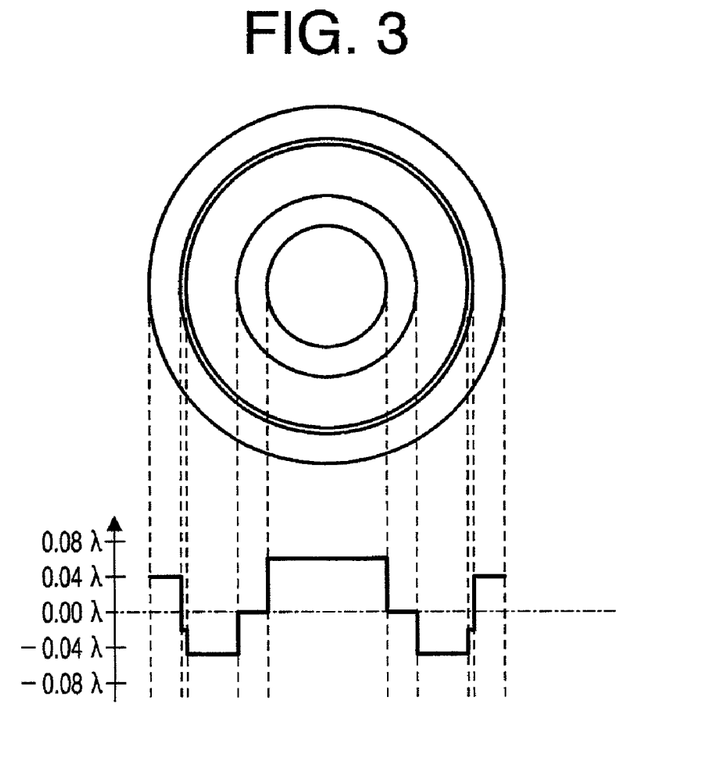
FIG. 3 shows a configuration of a liquid crystal aberration correcting device included in the optical system and optical path length differences to be provided thereby in the first embodiment according to one or more aspects of the present invention.

The liquid crystal aberration correcting device 20 is placed on a common optical path between each coupling lens and the objective lens 10. Further, the liquid crystal aberration correcting device 20 has a plurality of concentrically-sectioned areas, and changes a refractive index distribution in each area to provide a predetermined optical path length difference and thus correct the aberration. FIG. 3 shows a plan view of the liquid crystal aberration correcting device 20 and a graph representing an example of optical path length differences to be provided. The liquid crystal aberration correcting device 20 is formed by sandwiching a liquid crystal layer between transparent electrodes and further sandwiching the transparent electrodes with the liquid crystal therebetween between glass plates. Each of the transparent electrodes is provided with a pattern having a plurality of concentric annular zones as shown in FIG. 3. By controlling a voltage applied to each zone (area) of the pattern, a orientation condition of liquid crystal molecules in the liquid layer is changed, and thus a refraction index distribution is formed, Thereby, intended optical path length differences can be provided to a wave front so as to correct the aberration.

It is noted that the optical path length differences to be provided by the liquid crystal aberration correcting device 20 are desired to be equal to or less than 0.2λ of the wavelength 405 nm. Additionally, by reducing an amount of a phase provided by the liquid crystal aberration correcting device 20, it is possible to make the liquid crystal aberration correcting device 20 thin and reduce coma aberration caused when relative positional relationship between the objective lens 10 and the liquid crystal aberration correcting device 20 is changed due to the tracking mechanism.

Further, in the optical pickup device 100 of the first embodiment, the objective lens 10 is disposed so as to satisfy the following conditions (1) to (3):

$$0.05 < f_1 \times M_1 < 0.20 \quad (1)$$

$$0.05 < f_2 \times M_2 < 0.20 \quad (2)$$

$$-0.23 < f_3 \times M_3 < -0.03 \quad (3)$$

where f1 and M1 represent a focal length and an imaging magnification of the objective lens 10 in use of the HD DVD, respectively, f2 and M2 represent a focal length and an imaging magnification of the objective lens 10 in use of the DVD, respectively, and f3 and M3 represent a focal length and an imaging magnification of the objective lens 10 in use of the CD, respectively.

With the effect of the diffraction lens structure and such disposal of the objective lens as to satisfy the conditions (1) to (3), the spherical aberration caused due to the differences in the wavelength and protective layer thickness is corrected. Further, by controlling the liquid crystal aberration correcting device, the spherical aberration caused due to the environmental change is corrected.

When the values of "f1×M1" and "f2×M2" are more than the respective upper limits of the conditions (1) and (2), the aberration is increased in the tracking operation for each the HD DVD and DVD. When the values of "f1×M1" and "f2×M2" are less than the respective lower limits of the conditions (1) and (2), the aberration is increased in the tracking operation for the CD. When the value of "f3×M3" is more than the upper limit of the condition (3), an over-corrected aberration is left in use of the CD. Meanwhile, when the value of "f3×M3" is less than the lower limit of the condition (3), an under-corrected aberration is caused in use of the CD.

Further, in the optical pickup device 100 of the first embodiment, the objective lens 10 is disposed to satisfy the following condition (4):

$$-0.02 < f2 \times M2 - f1 \times M1 < 0.02 \quad (4).$$

When the condition (4) is satisfied, it is possible to downsize the optical system of the optical pickup device 100, and to reduce relative coma aberration caused when the light is incident obliquely with respect to respective optical axes of the optical systems for the HD DVD and the DVD.

In the first embodiment, the first, second, and third wavelengths are set to 405 nm, 660 nm, 790 nm, respectively. However, any other combination of wavelengths may be allowable, as far as the following condition (5) is satisfied:

$$\lambda1/(n1-1) : \lambda3/(n3-1) \approx 1:2 \quad (5)$$

where λ1 represents the first wavelength (405 nm), λ3 represents the third wavelength (790 nm), n1 represents a refractive index of the objective lens 10 for the first wavelength λ1, and n3 represents a refractive index of the objective lens 10 for the third wavelength λ3.

Subsequently, Tables 2 to 10 provide concrete numerical data in the first embodiment. Table 2 provides an overall specification, and Tables 3 to 5 provide numerical data concerning the optical systems for the respective optical disks as shown in FIGS. 2A to 2C. R, D, and n in some Tables represent a curvature radius (unit: mm) of a subject surface, a distance (unit: mm) between subject surfaces, and a refractive index of a subject optical element for a specified wavelength. A lens surface 11 (surface No. 11) of the objective lens 10 at the light source side is sectioned into the first area required for ensuring an NA of 0.47 for the CD and the second area outside the first area. Since the first and second areas have different designs, numerical data are shown separately therefor.

TABLE 2

| | Optical Disk | | |
|---|---|---|---|
| | HD DVD | DVD | CD |
| Wavelength | 405 | 660 | 790 |
| Focal Length | 3.00 | 3.10 | 3.12 |
| NA | 0.65 | 0.63 | 0.47 |
| Magnification M | 0.046 | 0.047 | −0.027 |

TABLE 3

| Surface No. | R | D | n (405 nm) | |
|---|---|---|---|---|
| 0 | | 2.60 | | Light Source 1A |
| 1 | ∞ | 2.00 | 1.52972 | Diffraction |
| 2 | ∞ | 15.00 | | Grating 2A |
| 3 | 31.810 | 1.50 | 1.52469 | Coupling Lens |
| 4 | −11.220 | 2.86 | | 3A |
| 5 | ∞ | 5.00 | 1.52972 | Beam Splitter 41 |
| 6 | ∞ | 1.00 | | |
| 7 | ∞ | 5.00 | 1.52972 | Beam Splitter 42 |
| 8 | ∞ | 1.00 | | |
| 9 | ∞ | 2.00 | 1.52972 | Liquid Crystal |
| 10 | ∞ | 10.07 | | Device 20 |
| 11 (First Area) | 1.820 | 2.30 | 1.52469 | Objective Lens |
| 11 (Second Area) | 1.820 | | | 10 |
| 12 | −6.583 | 1.19 | | |
| 13 | ∞ | 0.60 | 1.62231 | HD DVD |
| 14 | ∞ | — | | |

TABLE 4

| Surface No. | R | D | n (660 nm) | |
|---|---|---|---|---|
| 0 | | 2.70 | | Light Source 1B |
| 1 | ∞ | 2.00 | 1.51374 | Diffraction |
| 2 | ∞ | 15.00 | | Grating 2B |
| 3 | 33.260 | 1.50 | 1.54044 | Coupling Lens |
| 4 | −11.500 | 0.66 | | 3B |
| 5 | ∞ | 5.00 | 1.51374 | Beam Splitter 41 |
| 6 | ∞ | 1.00 | | |
| 7 | ∞ | 5.00 | 1.51374 | Beam Splitter 42 |
| 8 | ∞ | 1.00 | | |
| 9 | ∞ | 2.00 | 1.51374 | Liquid Crystal |
| 10 | ∞ | 10.00 | | Device 20 |
| 11 (First Area) | 1.820 | 2.30 | 1.50635 | Objective Lens |
| 11 (Second Area) | 1.820 | | | 10 |
| 12 | −6.583 | 1.26 | | |
| 13 | ∞ | 0.60 | 1.57961 | DVD |
| 14 | ∞ | — | | |

TABLE 5

| Surface No. | R | D | n (790 nm) | |
|---|---|---|---|---|
| 0 | | 2.92 | | Light Source 1C |
| 1 | ∞ | 2.00 | 1.51052 | Diffraction |
| 2 | ∞ | 11.00 | | Grating 2C |
| 3 | −141.900 | 1.50 | 1.53653 | Coupling Lens |
| 4 | −9.780 | 1.82 | | 3C |
| 5 | ∞ | 5.00 | 1.51052 | Beam Splitter 42 |
| 6 | ∞ | 1.00 | | |
| 7 | ∞ | 2.00 | 1.51052 | Liquid Crystal |
| 8 | ∞ | 10.14 | | Device 20 |
| 9 (First Area) | 1.820 | 2.30 | 1.50313 | Objective Lens |
| 9 (Second Area) | 1.820 | | | 10 |
| 10 | −6.583 | 1.12 | | |
| 11 | ∞ | 1.20 | 1.57307 | CD |
| 12 | ∞ | — | | |

Lens surfaces (surface No. 4) of the first to third coupling lens 3A to 3C at the disk side, and the lens surfaces 11 and 12 of the objective lens 10 are all rotational-symmetric aspheric surfaces. A rotational-symmetric aspheric surface can be expressed by the following equation (6):

$$X(h) = \frac{Ch^2}{1+\sqrt{1-(1+\kappa)C^2h^2}} + A_4h^4 + A_6h^6 + A_8h^8 + \ldots \quad (6)$$

where h represents a height from the optical axis of the aspheric surface, X(h) represents a distance (sag amount) from a tangent plane on the optical axis of the aspheric surface to the aspheric surface at the height h, C represents a curvature (1/r) on the optical axis of the aspheric surface, κ represents a conical coefficient, and $A_4, A_6, A_8, \ldots$ represent, respectively, aspheric surface coefficients of even-number-th orders of the fourth to twelfth orders. Conical coefficients κ and aspheric surface coefficients $A_4$ to $A_{12}$ of the first coupling lens 3A and the objective lens 10 in the first embodiment are shown in Table 6. Conical coefficient κ and aspheric surface coefficients $A_4$ to $A_{12}$ of the second coupling lens 3B in the first embodiment are shown in Table 7. Conical coefficient κ and aspheric surface coefficients $A_4$ to $A_{12}$ of the third coupling lens 3C in the first embodiment are shown in Table 8. It is noted that "E" in each table represents a power of 10 (for example, "1.1820E−04" denotes "1.1820×10$^{-04}$".

TABLE 6

| Surface No. | κ | A4 | A6 | A8 | A10 | A12 |
|---|---|---|---|---|---|---|
| 4 | 0.0000 | 1.1820E−04 | 5.4130E−07 | 1.8070E−09 | 0.0000E+00 | 0.0000E+00 |
| 11 (First Area) | −0.6000 | 4.1050E−03 | 5.2550E−04 | 2.1540E−04 | −4.3230E−05 | 1.5930E−05 |
| 11 (Second Area) | −0.6000 | 1.5050E−02 | −5.5860E−03 | 9.9070E−04 | −1.0120E−04 | 2.4970E−05 |
| 12 | 0.0000 | 3.4350E−02 | −1.2400E−02 | 5.5190E−03 | −1.5160E−03 | 1.6200E−04 |

TABLE 7

| Surface No. | κ | A4 | A6 | A8 | A10 | A12 |
|---|---|---|---|---|---|---|
| 4 | 0.0000 | 1.1040E−04 | 4.7700E−07 | 1.4940E−09 | 0.0000E+00 | 0.0000E+00 |

TABLE 8

| Surface No. | κ | A4 | A6 | A8 | A10 | A12 |
|---|---|---|---|---|---|---|
| 4 | 0.0000 | 5.4200E−05 | 4.9500E−07 | 3.8800E−09 | 0.0000E+00 | 0.0000E+00 |

The optical path length provided by the diffraction lens structure formed on the lens surface 11 of the objective lens 10 is expressed by an optical path difference function φ(h) defined as follows:

$$\phi(h) = (P_2 h^2 + P_4 h^4 + P_6 h^6 + \ldots) \times m \times \lambda$$

where $P_n$ represents a n-th (even-number-th) optical path difference function coefficient, and m represents the diffraction order. The optical path difference function φ(h) denotes an optical path difference in a point on the diffraction surface at an height h from the optical axis between a virtual light ray in a state where it is not diffracted by the diffraction lens structure and a light ray diffracted by the diffraction lens structure. Table 9 provides values of the optical path difference function coefficients. It is noted that the second area is configured such that the light with the wavelength 405 nm and the light with the wavelength 660 nm are converged on the recording surfaces of the HD DVD and the DVD, respectively, and that the light with the wavelength 790 nm is not converged. Thereby, it is possible to let the second area have an aperture regulating function for the light with the wavelength 790 nm and set a spot diameter to an intended value. Further, the diffraction lens structure of the second area is formed by combining a step structure to provide a (positive or negative) optical path length difference twice as long as the wavelength 405 nm at each step thereof and a step structure to provide a (positive or negative) optical path length difference five times as long as the wavelength 405 nm at each step thereof. Thereby, it is possible to converge the light with the wavelength 405 nm and the light with the wavelength 660 nm on the recording surfaces of the HD DVD and the DVD, respectively, and control a very small spherical aberration caused by change of the wavelength. Table 9 provides two kinds of optical path difference functions defining the respective diffractive lens structures.

Table 10 shown below provides a diffraction order and an effective radius for the light with each wavelength in each area of the diffraction lens structure in the first embodiment.

TABLE 10

| Diffraction Order m | Light with λ 405 nm | Light with λ 660 nm | Light with λ 790 nm | Effective Radius |
|---|---|---|---|---|
| First Area | 2 | 1 | 1 | 1.510 |
| Second Area (1) | 2 | 1 | — | 1.840 |
| Second Area (2) | 5 | 3 | — | |

Table 11 provides values of parameters in the aforementioned conditions (1) to (5) in the first embodiment, which values satisfy the respective conditions (1) to (5).

TABLE 11

| Condition | Value |
|---|---|
| (1) | 0.138 |
| (2) | 0.146 |
| (3) | −0.084 |
| (4) | 0.008 |
| (5) | 1:2.03 |

Figure 4A:
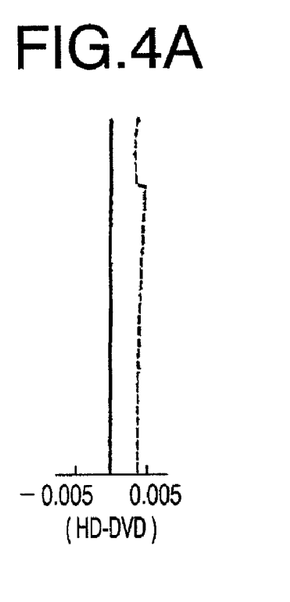
FIGS. 4A to 4C show spherical aberrations of the optical system in use of an HD DVD, DVD, and CD in the first embodiment according to one or more aspects of the present invention, respectively.
Figure 4B:
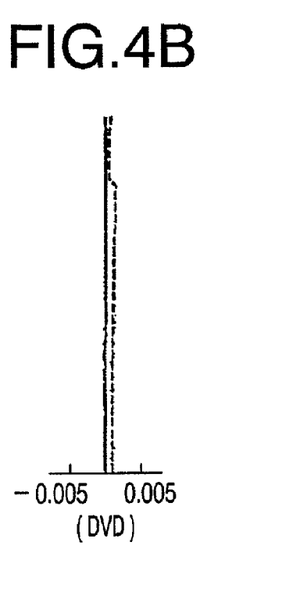
Figure 4C:
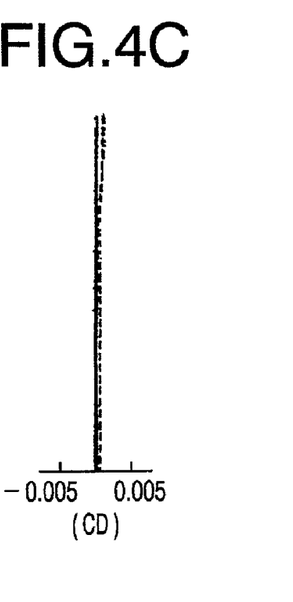

Subsequently, FIGS. 4A to 4C show spherical aberrations in use of the HD DVD, DVD, and CD in the optical pickup device of the first embodiment, respectively. In FIGS. 4A to 4C, each solid line and each dash line indicate spherical aberrations for the design wavelength and a wavelength with a wavelength shift of +5 nm in use of each optical disk, respectively.

Figure 5:
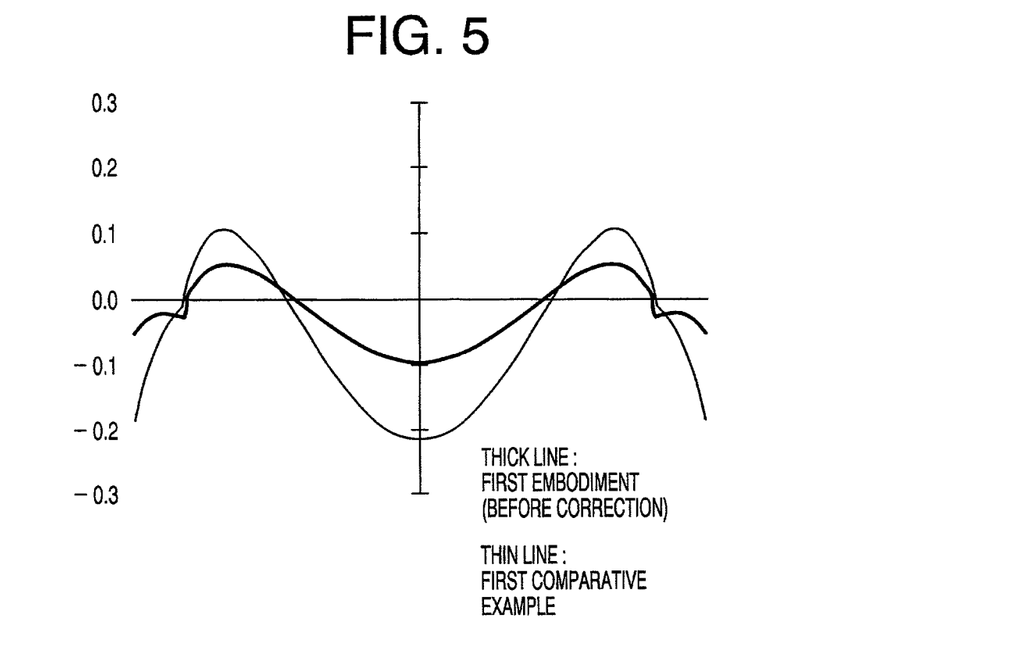
FIG. 5 shows wavefront aberrations in the case of temperature change being caused in use of the HD DVD in the first embodiment and a first comparative example.

Further, FIG. 5 shows wavefront aberrations in the case of temperature change (+30 degrees) being caused in use of the HD DVD in the first embodiment and first comparative

TABLE 9

Figure 6:
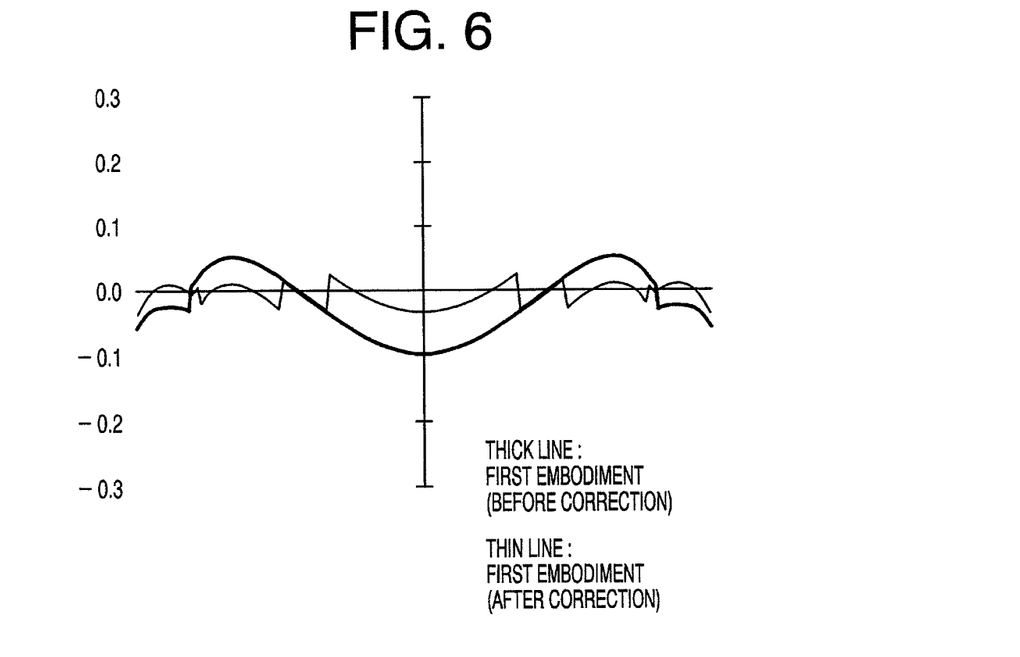
FIG. 6 shows wavefront aberrations before and after a correcting operation by the crystal liquid aberration correcting device in the first embodiment according to one or more aspects of the present invention.

| | P2 | P4 | P6 | P8 | P10 | P12 |
|---|---|---|---|---|---|---|
| First Area | 0.0000E+00 | 5.4490E−01 | 8.1430E−02 | 1.8060E−02 | 0.0000E+00 | 0.0000E+00 |
| Second Area (1) | 0.0000E+00 | 8.7390E−01 | −9.1190E−02 | 3.4350E−02 | 0.0000E+00 | 0.0000E+00 |
| Second Area (2) | 0.0000E+00 | 2.6360E+00 | −1.5640E+00 | 2.0250E−01 | 0.0000E−00 | 0.0000E+00 | example. In FIG. 5, a thick line indicates a wavefront aberration (0.039λ rms) when no voltage is applied to the liquid crystal aberration correcting device 20 (namely, when no correcting effect is provided) in the first embodiment, while a thin line indicates a wavefront aberration (0.081λ rms) in the first comparative example. The first comparative example is designed with the same focal length and NA as the first embodiment and a magnification of 0. As is understood from FIG. 5, when the magnification is set to be positive so as to comply with the condition (1), the wavefront aberration in the case of the temperature change can be reduced. Further, FIG. 6 shows wavefront aberrations before and after a voltage is applied to the crystal liquid aberration correcting device 20 so as to give the optical path length differences as shown in FIG. 3 in the first embodiment. In FIG. 6, a thick line denotes a wavefront aberration (0.039λ rms) before the voltage is applied, while a thin line denotes a wavefront aberration (0.013λ rms) after the voltage is applied. As is understood from FIG. 6, the wavefront aberration in the case of the temperature change is further restrained by using the liquid crystal aberration correcting device 20.

Second Embodiment

Figure 7A:
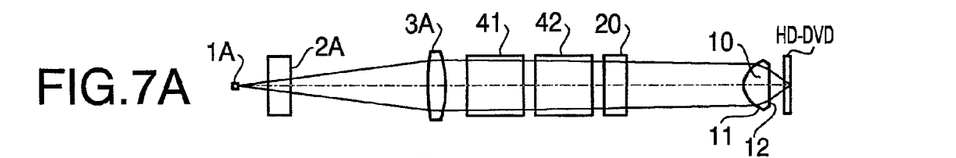
FIGS. 7A to 7C show schematic configurations obtained when three optical systems included in an optical system are individually developed in a second embodiment according to one or more aspects of the present invention.
Figure 7B:
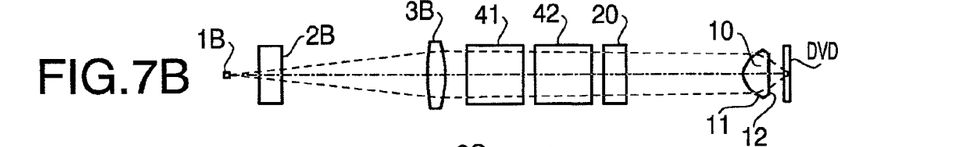
Figure 7C:
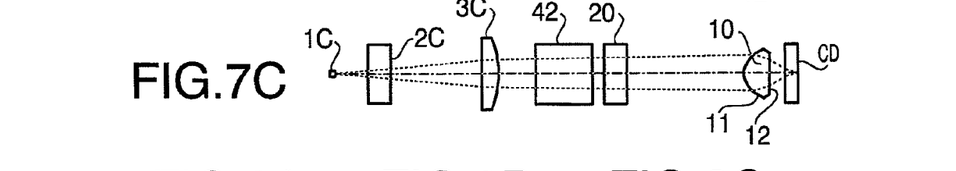

Next, an optical pickup device in a second embodiment according to aspects of the present invention will be described. A basic configuration of an optical system of an optical pickup device in the second embodiment is the same as that of the first embodiment shown in FIG. 1. Therefore, instead of showing an entire configuration of the optical system of the optical pickup device in the second embodiment, separate optical systems for the respective wavelengths (optical disks) are shown in FIGS. 7A to 7C, respectively. A reference character given to each optical element of the optical systems is the same as that in the first embodiment. Here, redundant explanation regarding each optical element will be avoided. Tables 12 to 21 shown below provide concrete numerical data in the second embodiment. Table 12 provides an overall specification, and Tables 13 to 15 provide numerical data concerning the optical systems for the respective optical disks as shown in FIGS. 7A to 7C. A lens surface 11 (surface No. 11) of the objective lens 10 at the light source side is sectioned into a first area required for ensuring an NA of 0.47 for the CD, a second area outside the first area required for ensuring an NA of 0.60 for the DVD, and a third area outside the second area. Since the first to third areas have different designs, numerical data are shown separately therefor.

TABLE 12

|  | Optical Disk | | |
| --- | --- | --- | --- |
|  | HD DVD | DVD | CD |
| Wavelength | 405 | 660 | 790 |
| Focal Length | 3.00 | 3.11 | 3.12 |
| NA | 0.65 | 0.60 | 0.47 |
| Magnification M | 0.020 | 0.021 | −0.055 |

TABLE 13

| Surface No. | R | D | n (405 nm) | |
| --- | --- | --- | --- | --- |
| 0 |  | 2.83 |  | Light Source 1A |
| 1 | ∞ | 2.00 | 1.52972 | Diffraction |
| 2 | ∞ | 12.00 |  | Grating 2A |

TABLE 13-continued

| Surface No. | R | D | n (405 nm) | |
| --- | --- | --- | --- | --- |
| 3 | 42.610 | 1.50 | 1.52469 | Coupling Lens |
| 4 | −9.850 | 1.86 |  | 3A |
| 5 | ∞ | 5.00 | 1.52972 | Beam Splitter 41 |
| 6 | ∞ | 1.00 |  |  |
| 7 | ∞ | 5.00 | 1.52972 | Beam Splitter 42 |
| 8 | ∞ | 1.00 |  |  |
| 9 | ∞ | 2.00 | 1.52972 | Liquid Crystal |
| 10 | ∞ | 10.08 |  | Device 20 |
| 11 (First Area) | 1.917 | 2.30 | 1.52469 | Objective Lens |
| 11 (Second Area) | 1.917 |  |  | 10 |
| 11 (Thidr Area) | 1.917 |  |  |  |
| 12 | −5.854 | 1.30 |  |  |
| 13 | ∞ | 0.60 | 1.62231 | HD DVD |
| 14 | ∞ | — |  |  |

TABLE 14

| Surface No. | R | D | n (660 nm) | |
| --- | --- | --- | --- | --- |
| 0 |  | 2.43 |  | Light Source 1B |
| 1 | ∞ | 2.00 | 1.51374 | Diffraction |
| 2 | ∞ | 13.00 |  | Grating 2B |
| 3 | 48.050 | 1.50 | 1.54044 | Coupling Lens |
| 4 | −10.350 | 1.83 |  | 3B |
| 5 | ∞ | 5.00 | 1.51374 | Beam Splitter 41 |
| 6 | ∞ | 1.00 |  |  |
| 7 | ∞ | 5.00 | 1.51374 | Beam Splitter 42 |
| 8 | ∞ | 1.00 |  |  |
| 9 | ∞ | 2.00 | 1.51374 | Liquid Crystal |
| 10 | ∞ | 10.00 |  | Device 20 |
| 11 (First Area) | 1.917 | 2.30 | 1.50635 | Objective Lens |
| 11 (Second Area) | 1.917 |  |  | 10 |
| 11 (Third Area) | 1.917 |  |  |  |
| 12 | −5.854 | 1.38 |  |  |
| 13 | ∞ | 0.60 | 1.57961 | DVD |
| 14 | ∞ | — |  |  |

TABLE 15

| Surface No. | R | D | n (790 nm) | |
| --- | --- | --- | --- | --- |
| 0 |  | 2.80 |  | Light Source 1C |
| 1 | ∞ | 2.00 | 1.51052 | Diffraction |
| 2 | ∞ | 8.00 |  | Grating 2C |
| 3 | −32.040 | 1.50 | 1.53653 | Coupling Lens |
| 4 | −8.170 | 3.30 |  | 3C |
| 5 | ∞ | 5.00 | 1.51052 | Beam Splitter 42 |
| 6 | ∞ | 1.00 |  |  |
| 7 | ∞ | 2.00 | 1.51052 | Liquid Crystal |
| 8 | ∞ | 10.14 |  | Device 20 |
| 9 (First Area) | 1.917 | 2.30 | 1.50313 | Objective Lens |
| 9 (Third Area) | 1.917 |  |  | 10 |
| 9 (Second Area) | 1.917 |  |  |  |
| 10 | −5.854 | 1.24 |  |  |
| 11 | ∞ | 1.20 | 1.57307 | CD |
| 12 | ∞ | — |  |  |

Lens surfaces (surface No. 4) of the first to third coupling lens 3A to 3C at the disk side, and the lens surfaces 11 and 12 of the objective lens 10 are all rotational-symmetric aspheric surfaces. Conical coefficients K and aspheric surface coefficients $A_4$ to $A_{12}$ of the first coupling lens 3A and the objective lens 10 in the second embodiment are shown in Table 16. Conical coefficient κ and aspheric surface coefficients $A_4$ to $A_{12}$ of the second coupling lens 3B in the second embodiment are shown in Table 17. Conical coefficient κ and aspheric surface coefficients $A_4$ to $A_{12}$ of the third coupling lens 3C in the second embodiment are shown in Table 18.

TABLE 16

| Surface No. | κ | A4 | A6 | A8 | A10 | A12 |
|---|---|---|---|---|---|---|
| 4 | 0.0000 | 1.2850E−04 | 8.9500E−07 | 4.9700E−09 | 0.0000E+00 | 0.0000E+00 |
| 11 (First Area) | −0.6000 | 2.6540E−03 | 4.5710E−04 | −7.2170E−04 | 4.7260E−05 | −9.5610E−06 |
| 11 (Second Area) | −0.6000 | 2.3140E−02 | −1.1750E−02 | 1.4350E−03 | 6.2340E−05 | 3.6510E−06 |
| 11 (Third Area) | −0.6000 | 6.7920E−03 | −1.8440E−03 | 9.5440E−04 | −2.9792E−04 | 2.2597E−05 |
| 12 | 0.0000 | 2.7910E−02 | −9.1780E−02 | 2.6260E−03 | −6.7580E−03 | 8.9330E−05 |

TABLE 17

| Surface No. | κ | A4 | A6 | A8 | A10 | A12 |
|---|---|---|---|---|---|---|
| 4 | 0.0000 | 1.0900E−04 | 6.9500E−07 | 3.4980E−09 | 0.0000E+00 | 0.0000E+00 |

TABLE 18

| Surface No. | κ | A4 | A6 | A8 | A10 | A12 |
|---|---|---|---|---|---|---|
| 4 | 0.0000 | 4.1610E−05 | 6.0620E−07 | 9.0000E−09 | 0.0000E+00 | 0.0000E+00 |

Table 19 shown below provides values of the optical path difference function coefficients that define the diffraction lens structure formed on the lens surface 11 of the objective lens 10. It is noted that the second area is configured such that the light with the wavelength 405 nm and the light with the wavelength 660 nm are converged on the recording surfaces of the HD DVD and the DVD, respectively, and that the light with the wavelength 790 nm is not converged. Further, the diffraction lens structure of the second area is formed by combining a diffraction lens structure to provide an optical path length difference twice as long as the wavelength 405 nm at each step thereof and a diffraction lens structure to provide an optical path length difference five times as long as the wavelength 405 nm at each step thereof. Table 19 provides two kinds of optical path difference functions defining the respective diffraction lens structures. Furthermore, the third area is configured to converge only the light with the wavelength 405 nm. An optical path length difference provided by the diffraction lens structure in the third area at each step thereof for the light with the wavelength 405 nm is different from that provided by the diffraction lens structure in the second area at each step thereof for the light with the wavelength 405 nm. Specifically, the diffraction lens structure in the third area is designed to provide an optical path length difference as long as the wavelength 405 nm at each step thereof.

Table 20 shown below provides a diffraction order and an effective radius for the light with each wavelength in each area of the diffraction lens structure in the second embodiment.

TABLE 20

| Diffraction Order m | Light with λ 405 nm | Light with λ 660 nm | Light with λ 790 nm | Effective Radius |
|---|---|---|---|---|
| First Area | 2 | 1 | 1 | 1.550 |
| Second Area (1) | 2 | 1 | — | 1.820 |
| Second Area (2) | 5 | 3 | — | |
| Third Area | 1 | — | — | 1.900 |

Table 21 provides values of the parameters in the aforementioned conditions (1) to (5) in the second embodiment, which values satisfy the respective conditions (1) to (5).

TABLE 21

| Condition | Value |
|---|---|
| (1) | 0.060 |
| (2) | 0.065 |
| (3) | −0.172 |

TABLE 19

| | P2 | P4 | P6 | P8 | P10 | P12 |
|---|---|---|---|---|---|---|
| First Area | −5.0000E+00 | 3.9260E−01 | 9.1150E−02 | 4.2400E−03 | 0.0000E+00 | 0.0000E+00 |
| Second Area (1) | −5.0000E+00 | 1.3010E−00 | −5.1590E−01 | 1.0250E−01 | 0.0000E+00 | 0.0000E+00 |
| Second Area (2) | 0.0000E+00 | 4.9340E+00 | −3.1790E+00 | 4.8680E−01 | 0.0000E−00 | 0.0000E+00 |
| Third Area | −1.0000E+01 | 6.2330E+00 | −1.4710E+00 | −7.3520E−02 | 0.0000E−00 | 0.0000E−00 |

TABLE 21-continued

| Condition | Value |
|---|---|
| (4) | 0.005 |
| (5) | 1:2.03 |

Figure 8A:
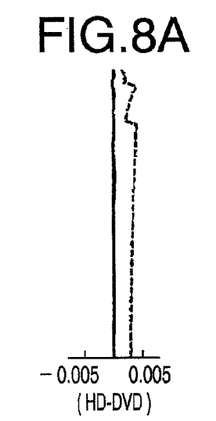
FIGS. 8A to 8C show spherical aberrations of the optical system in use of the HD DVD, DVD, and CD in the second embodiment according to one or more aspects of the present invention, respectively.
Figure 8B:
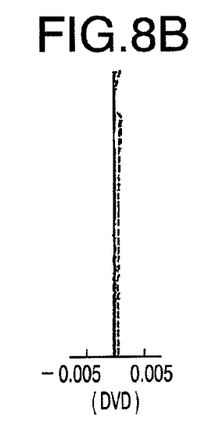
Figure 8C:
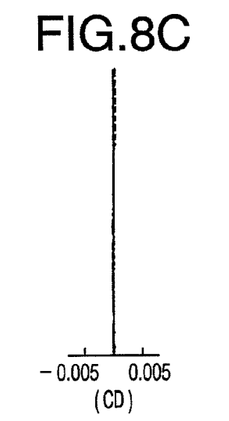

Subsequently, FIGS. 8A to 8C show spherical aberrations in use of the HD DVD, DVD, and CD in the optical pickup device of the second embodiment, respectively. In FIGS. 8A to 8C, each solid line and each dash line indicate spherical aberrations for the design wavelength and the wavelength with the wavelength shift +5 nm in use of each optical disk, respectively.

Figure 9:
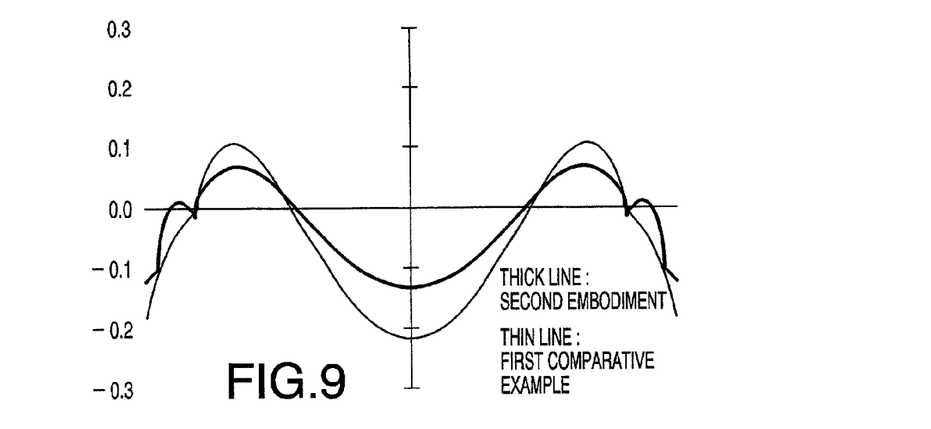
FIG. 9 shows wavefront aberrations in the case of temperature change being caused in use of the HD DVD in the second embodiment and the first comparative example.

Further, FIG. 9 shows wavefront aberrations in the case of temperature change (+30 degrees) being caused in use of the HD DVD in the second embodiment and first comparative example. In FIG. 9, a thick line indicates a wavefront aberration (0.058λ rms) when no voltage is applied to the liquid crystal aberration correcting device 20 (namely, when no correcting effect is provided) in the second embodiment, while a thin line indicates a wavefront aberration (0.081λ rms) in the first comparative example.

Third Embodiment

Figure 10:
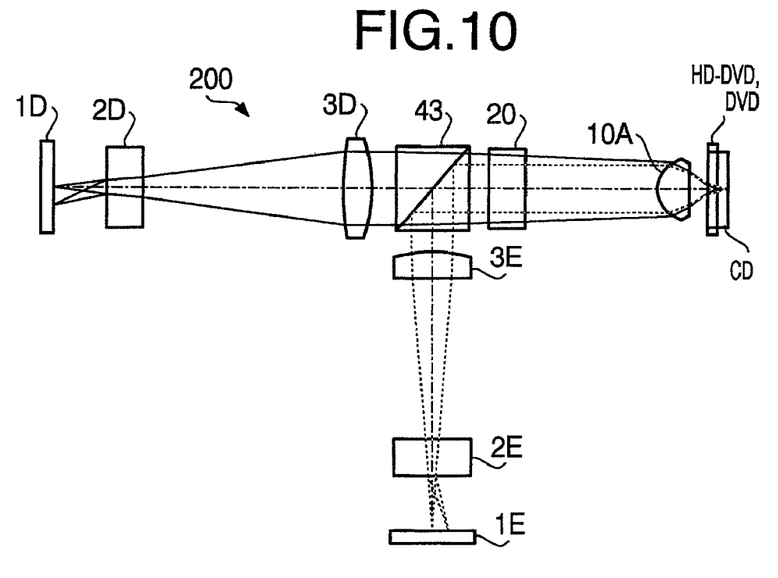
FIG. 10 schematically shows an optical system of an optical pickup device in a third embodiment according to one or more aspects of the present invention.
Figure 11A:
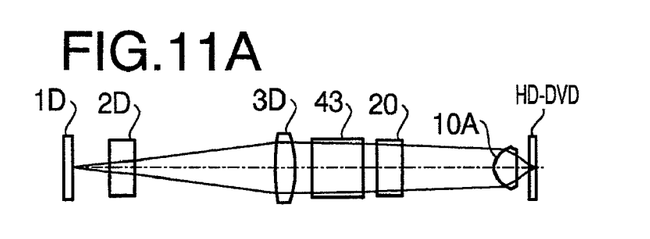
FIGS. 11A to 11C show schematic configurations obtained when three optical systems included in the optical system shown in FIG. 10 are individually developed in the third embodiment according to one or more aspects of the present invention.
Figure 11B:
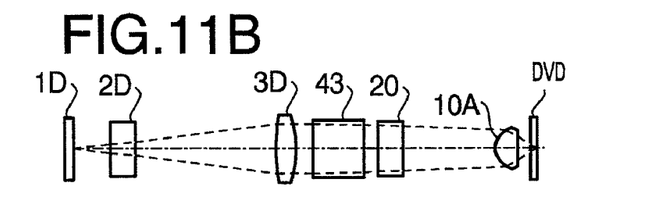
Figure 11C:
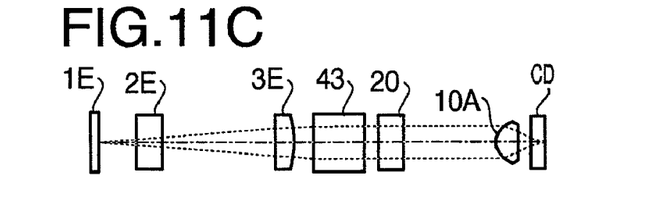

Next, an optical pickup device in a third embodiment according to aspects of the present invention will be described. FIG. 10 schematically shows an optical system of an optical pickup device 200 in a third embodiment according to aspects of the present invention. FIGS. 11A to 11C show schematic configurations obtained when three optical systems included in the optical system of FIG. 10 are individually developed. FIG. 11A shows an optical system for the HD DVD. FIG. 11B shows an optical system for the DVD. FIG. 11C shows an optical system for the CD.

The optical pickup device 200 in the third embodiment is configured to be more compact than those in the first and second embodiments by employing a module with a laser light source and detector integrated on the same board. A first module 1D is configured with a laser emitting element that emits light with the wavelength 405 nm for the HD DVD, a laser emitting element that emits light with the wavelength 660 nm for the DVD, and a detector being integrated on the same board. The light emitted by each of the laser emitting elements is transmitted through a diffraction grating 2D and converged through a first coupling lens 3D. Then the light is transmitted through the beam splitter 43 and incident on an objective lens 10A via the liquid crystal aberration correcting device 20. The light is further converged through the objective lens 10A to form a spot on the recording surface of the HD DVD or DVD. Then, the light reflected by the recording surface, tracing the same path as directed toward the recording surface of the HD DVD or DVD, is diffracted by the diffraction grating 2D and incident to the detector on the first module 1D.

A second module 1E is configured with a laser emitting element that emits light with the wavelength 790 nm for the CD and a detector being integrated on the same board. The light emitted by the laser emitting element is transmitted through a diffraction grating 2E and converted into a slightly diverging light through a second coupling lens 3E. Then the light is reflected by the beam splitter 43 and incident on the objective lens 10A via the liquid crystal aberration correcting device 20. The light is further converged through the objective lens 10A to form a spot on the recording surface of the CD. Then, the light reflected by the recording surface, tracing the same path as directed toward the CD, is diffracted by the diffraction grating 2E and incident to the detector on the second module 1E.

Tables 22 to 31 shown below provide concrete numerical data in the third embodiment. Table 22 provides an overall specification, and Tables 23 to 25 provide numerical data concerning the optical systems for the respective optical disks as shown in FIGS. 11A to 11C. A lens surface 9 (surface No. 9) of the objective lens 10A at the light source side is sectioned into a first area required for ensuring an NA of 0.47 for the CD, a second area outside the first area required for ensuring an NA of 0.65 for the HD DVD, and a third area outside the second area. Since the first to third areas have different designs, numerical data are shown separately therefor.

TABLE 22

| | Optical Disk | | |
|---|---|---|---|
| | HD DVD | DVD | CD |
| Wavelength | 405 | 660 | 790 |
| Focal Length | 2.43 | 2.53 | 2.53 |
| NA | 0.65 | 0.65 | 0.47 |
| Magnification M | 0.063 | 0.054 | −0.014 |

TABLE 23

| Surface No. | R | D | n (405 nm) | |
|---|---|---|---|---|
| 0 | | 2.76 | | Module 1D |
| 1 | ∞ | 2.00 | 1.52972 | Diffraction |
| 2 | ∞ | 11.00 | | Grating 2D |
| 3 | 19.760 | 1.50 | 1.52469 | Coupling Lens |
| 4 | −9.000 | 1.42 | | 3D |
| 5 | ∞ | 4.00 | 1.52972 | Beam Splitter 43 |
| 6 | ∞ | 1.00 | | |
| 7 | ∞ | 2.00 | 1.52972 | Liquid Crystal |
| 8 | ∞ | 7.09 | | Device 20 |
| 9 (First Area) | 1.505 | 1.80 | 1.52469 | Objective Lens |
| 9 (Second Area) | 1.505 | | | 10A |
| 9 (Thidr Area) | 1.505 | | | |
| 10 | −6.605 | 0.86 | | |
| 11 | ∞ | 0.60 | 1.62231 | HD DVD |
| 12 | ∞ | — | | |

TABLE 24

| Surface No. | R | D | n (660 nm) | |
|---|---|---|---|---|
| 0 | | 2.76 | | Module 1D |
| 1 | ∞ | 2.00 | 1.51374 | Diffraction Grating 2D |
| 2 | ∞ | 11.00 | | |
| 3 | 19.760 | 1.50 | 1.50635 | Coupling Lens 3D |
| 4 | −9.000 | 1.42 | | |
| 5 | ∞ | 4.00 | 1.51374 | Beam Splitter 43 |
| 6 | ∞ | 1.00 | | |
| 7 | ∞ | 2.00 | 1.51374 | Liquid Crystal Device 20 |
| 8 | ∞ | 7.00 | | |
| 9 (First Area) | 1.505 | 1.80 | 1.50635 | Objective Lens 10A |
| 9 (Second Area) | 1.505 | | | |
| 9 (Third Area) | 1.505 | | | |
| 10 | −6.605 | 0.95 | | |
| 11 | ∞ | 0.60 | 1.57961 | DVD |
| 12 | ∞ | — | | |

TABLE 25

| Surface No. | R | D | n (790 nm) | |
|---|---|---|---|---|
| 0 | | 2.96 | | Module 1E |
| 1 | ∞ | 2.00 | 1.51052 | Diffraction Grating 2E |
| 2 | ∞ | 9.00 | | |
| 3 | 285.000 | 1.50 | 1.53653 | Coupling Lens 3E |
| 4 | −8.550 | 1.41 | | |
| 5 | ∞ | 4.00 | 1.51052 | Beam Splitter 43 |
| 6 | ∞ | 1.00 | | |
| 7 | ∞ | 2.00 | 1.51052 | Liquid Crystal Device 20 |
| 8 | ∞ | 7.22 | | |
| 9 (First Area) | 1.505 | 1.80 | 1.50313 | Objective Lens 10A |
| 9 (Third Area) | 1.505 | | | |
| 9 (Second Area) | 1.505 | | | |
| 10 | −6.605 | 0.73 | | |
| 11 | ∞ | 1.20 | 1.57307 | CD |
| 12 | ∞ | — | | |

Lens surfaces (surface No. 4) of the first and second coupling lens 3D and 3E at the disk side, and the lens surfaces 9 and 10 of the objective lens 10A are all rotational-symmetric aspheric surfaces. Conical coefficients κ and aspheric surface coefficients $A_4$ to $A_{12}$ of the first coupling lens 3D and the objective lens 10A in the third embodiment are shown in Table 26. Conical coefficient κ and aspheric surface coefficients $A_4$ to $A_{12}$ of the second coupling lens 3E in the third embodiment are shown in Table 27.

TABLE 26

| Surface No. | κ | A4 | A6 | A8 | A10 | A12 |
|---|---|---|---|---|---|---|
| 4 | 0.0000 | 2.8400E−04 | 1.7740E−07 | 6.8590E−09 | 0.0000E+00 | 0.0000E+00 |
| 9 (First Area) | −0.6000 | 7.5910E−03 | 1.7310E−04 | 7.5670E−04 | −2.0660E−04 | 1.2910E−04 |
| 9 (Second Area) | −0.6000 | 1.5180E−02 | −8.4900E−04 | −9.1320E−04 | 3.8300E−04 | −3.2170E−05 |
| 9 (Third Area) | −0.6000 | 2.3900E−03 | −7.2990E−03 | 3.5030E−03 | −1.1246E−03 | 3.4638E−05 |
| 10 | 0.0000 | 6.0960E−02 | −3.2440E−02 | 2.1190E−03 | −9.8190E−03 | 1.9520E−03 |

TABLE 27

| Surface No. | κ | A4 | A6 | A8 | A10 | A12 |
|---|---|---|---|---|---|---|
| 4 | 0.0000 | 1.1130E−04 | 1.2500E−06 | 1.1800E−08 | 0.0000E+00 | 0.0000E+00 |

Table 28 shown below provides values of the optical path difference function coefficients that define the diffraction lens structure formed on the lens surface 9 of the objective lens 10. It is noted that the second area is configured such that the light with the wavelength 405 nm and the light with the wavelength 660 nm are converged on the recording surfaces of the HD DVD and the DVD, respectively, and that the light with the wavelength 790 nm is not converged. Further, the diffraction lens structure of the second area is formed by combining a diffraction lens structure to provide an optical path length difference twice as long as the wavelength 405 nm at each step thereof and a diffraction lens structure to provide an optical path length difference five times as long as the wavelength 405 nm at each step thereof. Table 28 provides two kinds of optical path difference functions defining the respective diffraction lens structures. Furthermore, the third area is configured to converge only the light with the wavelength 660 nm. An optical path length difference provided by the diffraction lens structure in the third area at each step thereof for the light with the wavelength 660 nm is different from that provided by the diffraction lens structure in the second area at each step thereof for the light with the wavelength 660 nm. Specifically, the diffraction lens structure in the third area is designed to provide an optical path length difference as long as the wavelength 660 nm at each step thereof.

TABLE 28

|  | P2 | P4 | P6 | P8 | P10 | P12 |
|---|---|---|---|---|---|---|
| First Area | −1.1000E+01 | −8.8300E−01 | 7.6200E−02 | −2.8310E−02 | 0.0000E+00 | 0.0000E+00 |
| Second Area (1) | −1.1000E+01 | −7.4300E−01 | 1.3200E−02 | −4.1430E−02 | 0.0000E+00 | 0.0000E+00 |
| Second Area (2) | 0.0000E+00 | 2.0000E+00 | −1.1110E+00 | −4.3030E−02 | 0.0000E−00 | 0.0000E+00 |
| Third Area | −1.1000E+01 | 8.0000E+00 | −1.5440E+00 | −1.3820E−00 | 0.0000E−00 | 0.0000E−00 |

Table 29 shown below provides a diffraction order and an effective radius for the light with each wavelength in each area of the diffraction lens structure in the third embodiment.

TABLE 29

| Diffraction Order m | Light with $\lambda$ 405 nm | Light with $\lambda$ 660 nm | Light with $\lambda$ 790 nm | Effective Radius |
|---|---|---|---|---|
| First Area | 2 | 1 | 1 | 1.205 |
| Second Area (1) | 2 | 1 | — | 1.455 |
| Second Area (2) | 5 | 3 | — | |
| Third Area | — | 1 | — | 1.540 |

Table 30 provides values of the parameters in the aforementioned conditions (1) to (5) in the third embodiment, which values satisfy the respective conditions (1) to (5).

TABLE 30

| Condition | Value |
|---|---|
| (1) | 0.153 |
| (2) | 0.137 |
| (3) | −0.035 |
| (4) | −0.016 |
| (5) | 1:2.03 |

Figure 12A:
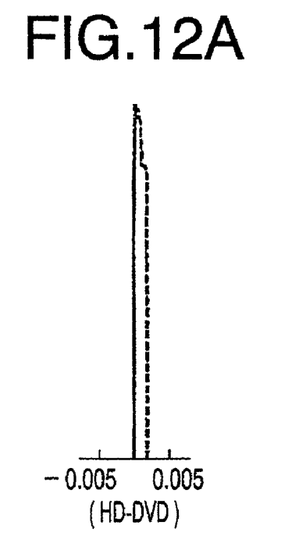
FIGS. 12A to 12C show spherical aberrations of the optical system in use of the HD DVD, DVD, and CD in the third embodiment according to one or more aspects of the present invention, respectively.
Figure 12B:
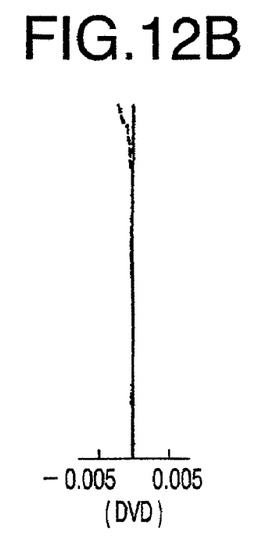
Figure 12C:
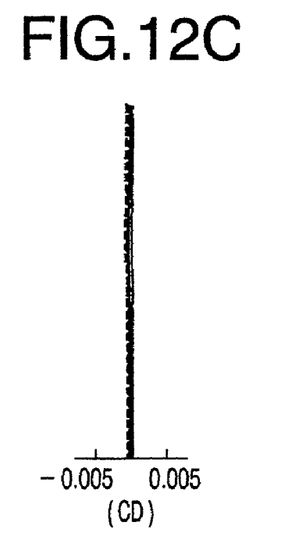

Subsequently, FIGS. 12A to 12C show spherical aberrations in use of the respective optical disks in the optical pickup device of the third embodiment, respectively. In FIGS. 12A to 12C, each solid line and each dash line indicate spherical aberrations for the design wavelength and the wavelength with the wavelength shift +5 nm in use of each optical disk, respectively.

Figure 13:
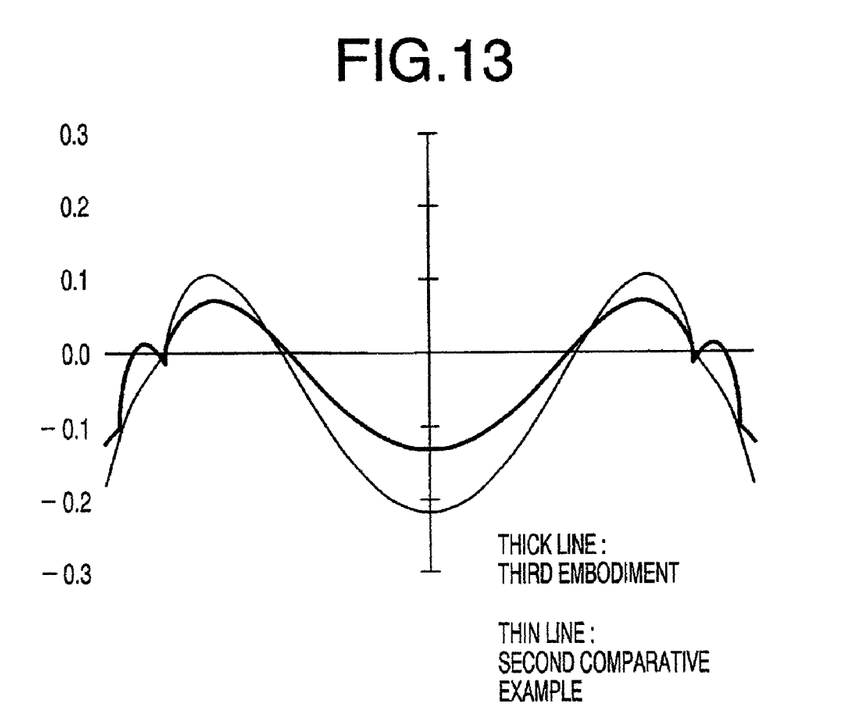
FIG. 13 shows wavefront aberrations in the case of temperature change being caused in use of the HD DVD in the third embodiment and a second comparative example, respectively.

Further, FIG. 13 shows wavefront aberrations in the case of temperature change (+30 degrees) being caused in use of the HD DVD in the third embodiment and a second comparative example, respectively. In FIG. 13, a thick line indicates a wavefront aberration (0.016$\lambda$ rms) when no voltage is applied to the liquid crystal aberration correcting device 20 (namely, when no correcting effect is provided) in the third embodiment, while a thin line indicates a wavefront aberration (0.054$\lambda$ rms) in the second comparative example. The comparative example 2 is set with the same focal length and the same NA as the third embodiment and a magnification of 0. As is understood from FIG. 13, when the magnification is set to be positive so as to comply with the condition (1), the wavefront aberration in the case of the temperature change can be reduced.

As described above, in any of the aforementioned embodiments, the conditions (1) to (5) are satisfied and the spherical aberration caused due to the temperature change can be restrained. Additionally, since an aberration amount to be corrected by the liquid crystal aberration correcting device is small, it is possible to make the liquid crystal aberration correcting device thinner. Further, since a so high relative positional accuracy between the liquid crystal aberration correcting device and the objective lens is not required, it is possible to provide the liquid crystal aberration correcting device outside a tracking mechanism and thus to make the tracking mechanism more responsive.

The present disclosure relates to the subject matter contained in Japanese Patent Application No. P2007-184859, filed on Jul. 13, 2007, which is expressly incorporated herein by reference in its entirety.

What is claimed is:

1. An optical pickup device configured to perform read/write operations for a first optical disk, a second optical disk, and a third optical disk, comprising:
   a first light source configured to emit first light with a first wavelength in use of the first optical disk;
   a second light source configured to emit second light with a second wavelength longer than the first wavelength in use of the second optical disk;
   a third light source configured to emit third light with a third wavelength longer than the second wavelength in use of the third optical disk;
   an objective lens having a step structure on at least one surface thereof, the step structure being formed with a plurality of refractive surfaces as concentrically-divided annular zones so as to provide incident light with a predetermined optical path length difference at a step between any adjacent two of the refractive surfaces, the objective lens being configured to converge the first light, the second light, and the third light onto the first optical disk, the second optical disk, and the third optical disk, respectively;
   at least one first coupling lens configured to make the first light and the second light incident onto the objective lens as converged light;
   a second coupling lens configured to make the third light incident onto the objective lens as diverging light; and
   a liquid crystal aberration correcting element provided on a common optical path between one of the at least one first coupling lens and the second coupling lens and the objective lens, the liquid crystal aberration correcting element being configured with a plurality of concentrically-divided areas so as to provide incident light with a predetermined optical path length difference in each of the areas and correct aberration,
   wherein a following condition is satisfied:

NA1>NA3, and NA2>NA3, where NA1 represents a numerical aperture required for use of the first optical disk, NA2 represents a numerical aperture required for use of the second optical disk, and NA3 represents a numerical aperture required for use of the third optical disk,
   wherein the step structure includes a first area required for ensuring NA3, the first area being formed to provide incident light, at each step therein, with an optical path length difference substantially twice as long as the first wavelength, and wherein the objective lens is disposed so as to satisfy following conditions (1), (2), and (3):

$$0.05 < f1 \times M1 < 0.20 \quad (1)$$

$$0.05 < f2 \times M2 < 0.20 \quad (2)$$

$$-0.23 < f3 \times M3 < -0.03 \quad (3)$$

where f1 and M1 represent a focal length and an imaging magnification of the objective lens in use of the first optical disk, respectively, f2 and M2 represent a focal length and an imaging magnification of the objective lens in use of the second optical disk, respectively, and f3 and M3 represent a focal length and an imaging magnification of the objective lens in use of the third optical disk, respectively.

2. The optical pickup device according to claim 1,
wherein the first optical disk has a protective layer with a first thickness t1 and a first recording density,
wherein the second optical disk has a protective layer with a second thickness t2 equal to or thicker than the first thickness t1 and a second recording density smaller than the first recording density, and
wherein the third optical disk has a protective layer with a third thickness t3 thicker than the second thickness t2 and a third recording density smaller than the second recording density.

3. The optical pickup device according to claim 2,
wherein spherical aberration caused by a wavelength difference between the first light, second light, and third light and a protective layer thickness difference between the first, second, and third optical disks is corrected owing to the step structure and the disposal of the objective lens to satisfy the conditions (1), (2), and (3), and
wherein spherical aberration caused by an environmental change is corrected by controlling the liquid crystal aberration correcting element.

4. The optical pickup device according to claim 2,
wherein the first thickness of the protective layer of the first optical disk and the second thickness of the protective layer of the second optical disk are equal to about 0.6 mm, and
wherein the third thickness of the protective layer of the third optical disk is equal to about 1.2 mm.

5. The optical pickup device according to claim 1,
wherein the objective lens is disposed to further satisfy a following condition (4):

$$-0.02 < f2 \times M2 - f1 \times M1 < 0.02 \quad (4).$$

6. The optical pickup device according to claim 1,
wherein the liquid crystal aberration correcting element is configured to provide incident light with an optical path length difference 0.2 times as long as the first wavelength or less.

7. The optical pickup device according to claim 1,
wherein the objective lens is provided to follow a tracking operation for making a spot formed on each of the optical disks follow a track on each of the optical disks, and
wherein the liquid crystal aberration correcting element is provided not to follow the tracking operation.

8. The optical pickup device according to claim 1,
wherein the step structure of the objective lens includes a second area outside the first area,
wherein the second area is formed to converge only the first light and the second light on recording surfaces of the first and second optical disks, respectively, and
wherein the second area is formed by combining a step structure configured to provide incident light at each step thereof with a positive or negative optical path length difference substantially twice as long as the first wavelength and a structure configured to provide incident light at each step thereof with a positive or negative optical path length difference substantially five times as long as the first wavelength.

9. The optical pickup device according to claim 8,
wherein an effective diameter of the first light on a lens surface of the objective lens at a light source side is larger than an effective diameter of the second light on a lens surface of the objective lens at a light source side,
wherein the step structure of the objective lens includes a third area outside the second area,
wherein the third area is formed to converge only the first light on the recording surface of the first optical disk, and
wherein the optical path length difference provided to the first light at each step in the third area is different from an optical path length difference provided to the first light at each step in the second area.

10. The optical pickup device according to claim 9,
wherein the third area is formed to provide incident light with a optical path length difference substantially as long as the first wavelength.

11. The optical pickup device according to claim 8,
wherein an effective diameter of the second light on a lens surface of the objective lens at a light source side is larger than an effective diameter of the first light on a lens surface of the objective lens at a light source side,
wherein the step structure of the objective lens includes a third area outside the second area,
wherein the third area is formed to converge only the second light on the recording surface of the second optical disk, and
wherein the optical path length difference provided to the second light at each step in the third area is different from an optical path length difference provided to the second light at each step in the second area.

12. The optical pickup device according to claim 11,
wherein the third area is formed to provide incident light with a optical path length difference substantially as long as the second wavelength.

13. The optical pickup device according to claim 1, which is configured to satisfy a following condition (5):

$$\lambda1/(n1-1):\lambda3/(n3-1) \approx 1:2 \quad (5)$$

where $\lambda1$ represents the first wavelength, $\lambda3$ represents the third wavelength, n1 represents a refractive index of the objective lens for the first wavelength $\lambda1$, and n3 represents a refractive index of the objective lens for the third wavelength $\lambda3$.

* * * * *